United States Patent Office 2,882,180
Patented Apr. 14, 1959

2,882,180

METHOD OF PRODUCING GLAZE COATINGS ON CEMENT OR CONCRETE WALLS AND PLATES

Rudolf Knoll, Crailsheim, Wurttemberg, Germany, assignor to Opalite, Inc., Minneapolis, Minn., a corporation of Minnesota No Drawing. Application July 28, 1954
Serial No. 446,411

2 Claims. (Cl. 117—54)

This invention relates to wall facings and wall plates of mineral material including concrete and cement. It is concerned more particularly with a method of depositing on such facings or plates cold-glaze layers.

Cold glaze layers of the type involved by the present invention are disclosed e.g. in U.S.P. 2,230,519, and in short, are cementitious glazings produced in the cold.

The method hitherto used in the production of water repellent wall facings or plates consists in the coating of these facings or plates with coatings produced in the heat by melting or sintering. Plates of this description, more especially if they have a colored surface (majolica plates) command a relatively high price and one has therefore tried repeatedly to produce them without the application of heat. The cheapest material to be used for these plates is cement or concrete, and such plates are produced in the usual manner by tamping, pressing or casting in forms. In trying to directly apply to these plates so called cold glaze, considerable difficulties have been met which are due to the difficulty of exactly adjusting the water absorption capacity of the plate material and the so-called efflorescence of the salts and the like contained in the soil.

The variations of the adsorption capacity of sprayed on cold glaze due to the variations of the water content is likely to render the glaze layer mat and turbid. If the water required for the setting of the mass is removed too early the strength and hardness of the glaze layer are greatly affected. A similar effect is due to the efflorescence of the salts in the soil.

It has therefore been tried to reduce the absorbing capacity of the plate material by applying to it a waterproof cement slop or the like. While this step may favorably influence the setting of the glaze, it is accompanied by the drawback that also the adhesive force between the cement slop which loses its touch and the cold glaze layer then deposited is decreased, so that the differences of tension which exist in the layers of different composition favor the forming of cracks and fissures and may even lead to a peeling off of the cold glaze layer.

According to this invention now, all these drawbacks are avoided by coating the cement or concrete layer with a non-ceramic organic layer impermeable to water, which, however, does not destroy the coarseness of the material which is necessary for the adhesion of this layer, which is so thin that it adheres firmly to the cold glaze layer covering it, being preferably produced by spraying. Thus the organic separating layer does not prevent the glaze layer from firmly adhering to the ceramic material.

I have found that it is necessary for the production of an intermediate layer impermeable to water or at least checking the entrance of water to use an organic compound which does not possess any undue hardness but is still deformable to a certain extent and is yielding so that any tension owing to differences of temperature and the like between the ceramic layer and the glaze layer can be equalized without leading to the formation of fissures or to the peeling off of the glaze.

I have found that a favorable material for the purpose here in view is a watery emulsion of a comparatively soft artificial resin preferably of thermoplastic character, which may be imparted the softness necessary for this particular purpose by the addition of well known commercial softeners.

I have found that it is advisable to apply the cold glaze material at a moment where the colloidal organic intermediate layer has solidified to the extent of being able to check the passage of water or other liquids between the basic material such as cement or concrete and the glaze. Such water as may still be present in the intermediate layer, can be separated out without any detriment to the quality of the cold gaze, during the setting and the drying of the glaze.

Obviously it is possible to add to the cold glaze material ingredients such as for instance alkali or alkaline earth salts for instance chlorides or metal soaps which impart to it a favorable strength and glass.

With the aid of this method it becomes possible to avoid the time-consuming and uncertain treatment of the plates or the like with water and the wetting of the wall surface to be glazed.

In practicing my invention I may for instance make a facing or a plate by mixing 5 parts river sand with 1 part of ordinary blast furnace cement and agitate the mixture under addition of water for the production of a mortar-like mass which can then be applied by means of well known tools such as a ladle or a trowel on the brickwork and is spread thereon to obtain a comparatively smooth surface. After setting and drying this facing, which has a coarse surface, is coated according to this invention, with a highly fluid preferably colorless commercial cellulose lacquer.

Instead of such a lacquer I may also use a solution of Celluloid in acetone or of equivalent artificial resin dissolved in a solvent such as benzene.

I may, for instance, dissolve 100 gr. of cellulosic resin in 1,000 cu. cms. benzene. Also the cellulose lacquers which are used for the production of extremely thin coatings on brass or silver objects may be used for the same purpose.

Another example for the production of glazed wall plates consists in mixing 1 part Portland cement, preferably of the so-called waterproof type, with 3–4 parts of a sand such as results in the grinding of blast furnace slag. To this mixture water is added and the mortar-like mass is then placed in flat sheet metal forms which are placed on a jolting table on which they are freed from air bubbles. After the setting of this mass the plates may be hardened by the action of steam and are then coated with a colloidal solution of thermoplastic artificial resins such as are available in commerce and which are prepared with well known emulsifying materials of the desired hardness or softness.

After these plates have dried out, some well known cold glaze material is deposited thereon for instance by spraying and the plates thus prepared are allowed to dry in a chamber protected against the entrance of dust.

I wish it to be understood that I do not desire to be limited to the details described in the foregoing specification for obvious modifications will occur to a person skilled in the art.

I claim:

1. In the production of a glazed surface layer on a water permeable mineral base, the steps of providing said base with a rough surface and coating thereon a thin layer of a synthetic cellulose derivative plastic adapted to adhere to the rough surface of said base, and applying cementitious cold glaze material over the plastic layer, the plastic layer adhering to the base surface and as well as to the back of said cold glaze layer.

2. The method of providing a water permeable mineral base with a glazed surface, comprising coating said base by spraying thereon an aqueous emulsion of a soft synthetic cellulose derivative plastic to form a layer adapted after absorption and evaporation of the water and other volatile constituents, to be sufficiently pliable for equalizing the stress arising between base and surface because of their distinct constitutions, and spraying cementitious cold glaze material on the thus coated base.

References Cited in the file of this patent

UNITED STATES PATENTS

| | | |
|---|---|---|
| 1,239,074 | Bagnall et al. | Sept. 4, 1917 |
| 2,307,696 | Blair-McGuffie | Jan. 5, 1943 |
| 2,422,665 | Fredrickson | June 24, 1947 |
| 2,488,251 | Wood | Nov. 15, 1949 |
| 2,756,167 | Barnett | July 24, 1956 |
| 2,760,885 | Larsen | Aug. 28, 1956 |